(12) United States Patent
Yang

(10) Patent No.: US 7,543,929 B2
(45) Date of Patent: Jun. 9, 2009

(54) EYEGLASSES WITH A DETACHABLE AUXILIARY SUPPORT

(75) Inventor: Shun-Tien Yang, Tainan Hsien (TW)

(73) Assignee: All-Logic Int. Co., Ltd., Yung-Kang, Tainan Hsien (TW)

( * ) Notice: Subject to any disclaimer, the term of this patent is extended or adjusted under 35 U.S.C. 154(b) by 23 days.

(21) Appl. No.: 11/952,402

(22) Filed: Dec. 7, 2007

(65) Prior Publication Data
US 2009/0079931 A1    Mar. 26, 2009

(51) Int. Cl.
*G02C 11/08* (2006.01)
(52) U.S. Cl. .............................. 351/62; 351/41; 351/132
(58) Field of Classification Search ................... 351/41, 351/44, 62, 124, 130–132
See application file for complete search history.

(56) References Cited

U.S. PATENT DOCUMENTS 4,934,807 A * 6/1990 Bolle et al. ................... 351/62
6,749,299 B1 * 6/2004 Hsu ............................. 351/62
2005/0105042 A1 * 5/2005 Lin ............................. 351/136

* cited by examiner

*Primary Examiner*—Huy K Mai
(74) *Attorney, Agent, or Firm*—Pearl Cohen Zedek Latzer, LLP

(57) ABSTRACT

A pair of eyeglasses includes a frame and an auxiliary support. The frame has a pair of lens holders and a bridge interconnecting the lens holders. The bridge is formed with a slot. The auxiliary support is detachably mounted on the frame. The frame is formed with a recess and a protrusion. Further, the auxiliary support includes a bar abutting against the frame, a clasp extending downwardly from the bar and engaging releasably the slot in the bridge, a hook protruding from the bar and engaging releasably the recess, and a buckle protruding from the bar and formed with an aperture. The protrusion of the frame engages releasably the aperture in the buckle.

7 Claims, 6 Drawing Sheets

EYEGLASSES WITH A DETACHABLE AUXILIARY SUPPORT

BACKGROUND OF THE INVENTION

1. Field of the Invention

This invention relates to eyeglasses, and more particularly, to eyeglasses with a detachable auxiliary support that is used to shield the eyes of a wearer from airborne particles and to provide wearer comfort.

2. Description of the Related Art

Generally, conventional corrective eyeglasses and safety eyeglasses are marketed as different products where each is designed specifically to serve a different purpose. For instance, safety eyeglasses are designed for wearer protection, whereas corrective eyeglasses are used to improve vision of the wearer and are limited in their ability to provide safety due to, for example, the large gap between the corrective eyeglasses and the wearer's face. Both types of eyeglasses are highly lacking in the area of comfort.

In the event the wearer of the corrective eyeglasses needs to use the safety eyeglasses, the wearer needs to switch the corrective eyeglasses for the safety eyeglasses. This is a cumbersome process and requires that the wearer carry around two sets of eyeglasses.

SUMMARY OF THE INVENTION

Therefore, it is an object of the present invention to provide eyeglasses capable of overcoming the above-mentioned drawbacks of the prior art.

According to the present invention, a pair of eyeglasses includes a frame and an auxiliary support. The frame has a pair of lens holders and a bridge interconnecting the lens holders. The bridge is formed with a slot. The auxiliary support is detachably mounted on the frame. The frame is formed with a recess and a protrusion. Further, the auxiliary support includes a bar abutting against the frame, a clasp extending downwardly from the bar and engaging releasably the slot in the bridge, a hook protruding from the bar and engaging releasably the recess, and a buckle protruding from the bar and formed with an aperture. The protrusion of the frame engages releasably the aperture in the buckle.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
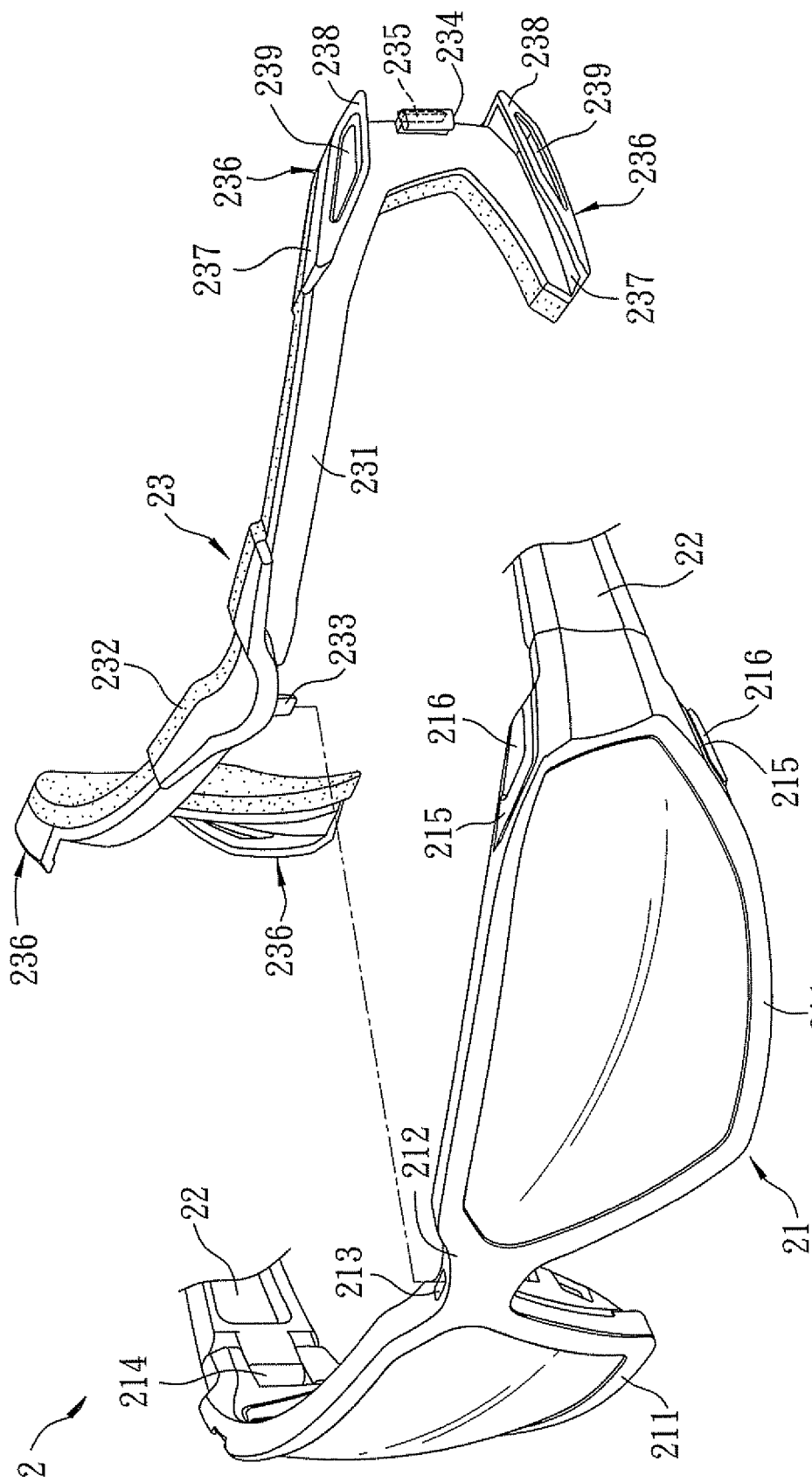
FIG. 1 is a fragmentary exploded perspective view of a pair of eyeglasses according to the preferred embodiment of the present invention.
Figure 2:
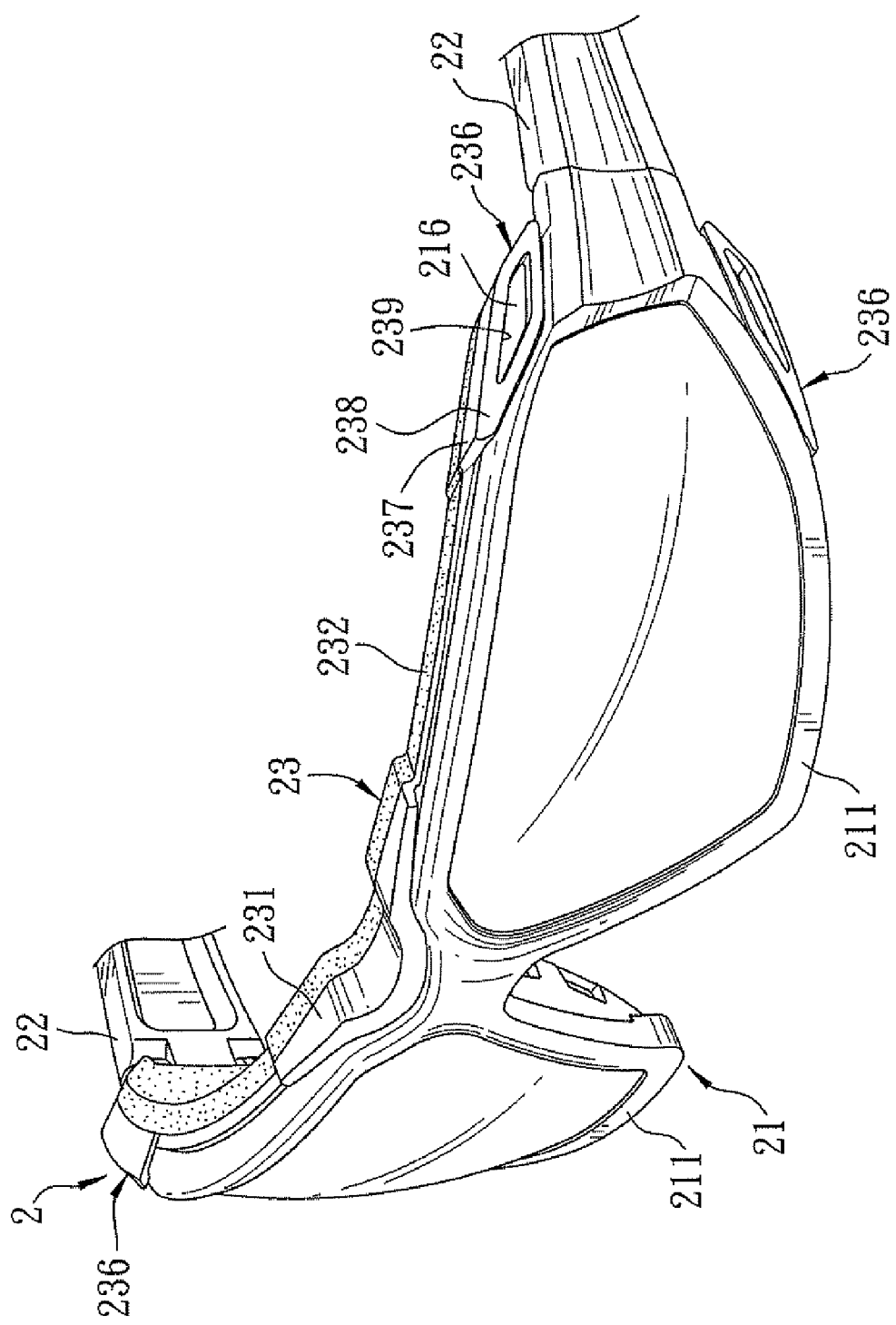
FIG. 2 is a fragmentary assembled perspective view of the preferred embodiment.

Referring to FIGS. 1 and 2, the preferred embodiment of eyeglasses 2 according to the present invention includes a frame 21 and an auxiliary support 23. The frame 21 has a pair of lens holders 211 and a bridge 212 interconnecting the lens holders 211. The bridge 212 is formed with a slot 213. The auxiliary support 23 is detachably mounted on the frame 21.

Figure 3:
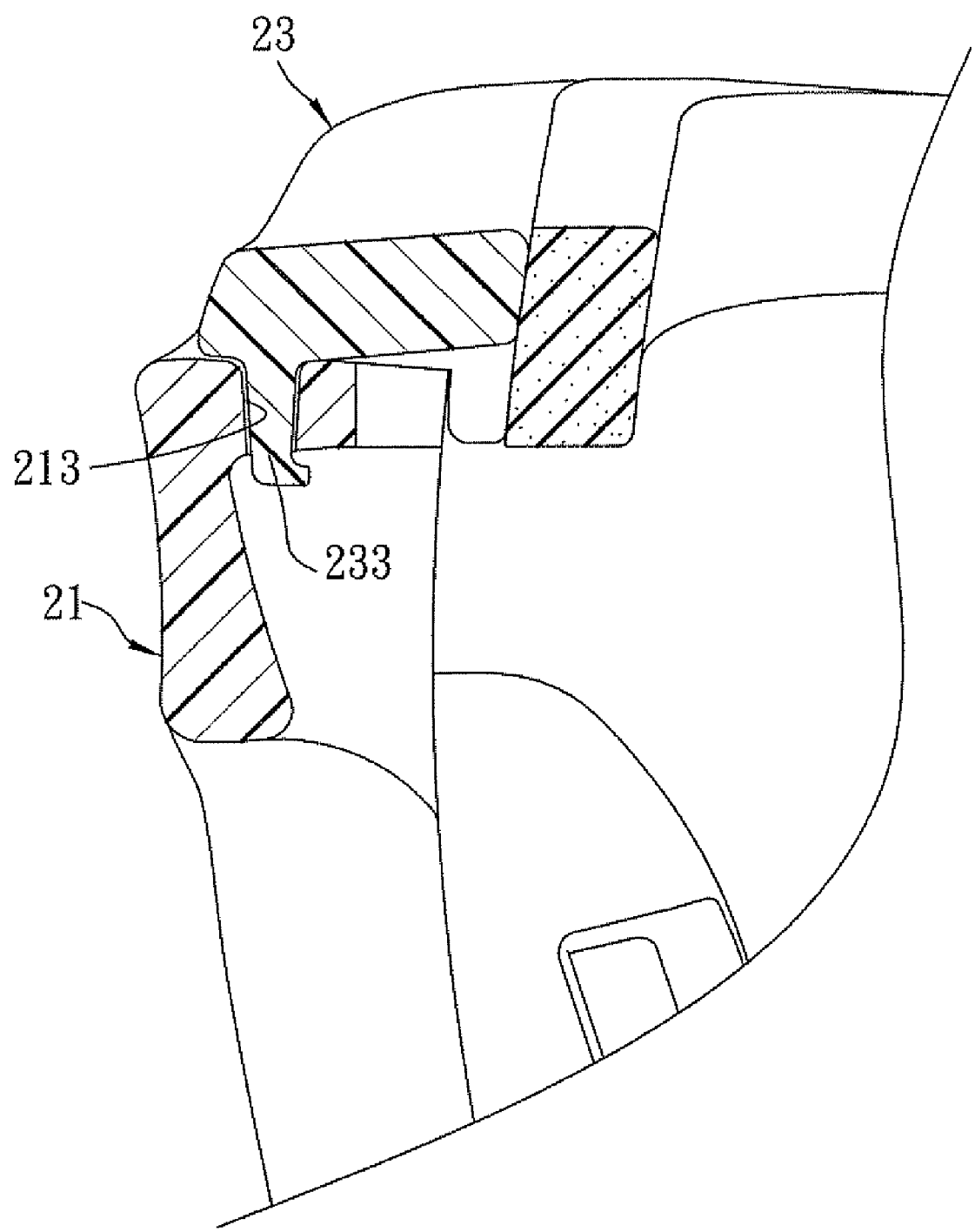
FIG. 3 is a fragmentary side sectional view of the preferred embodiment.
Figure 4:
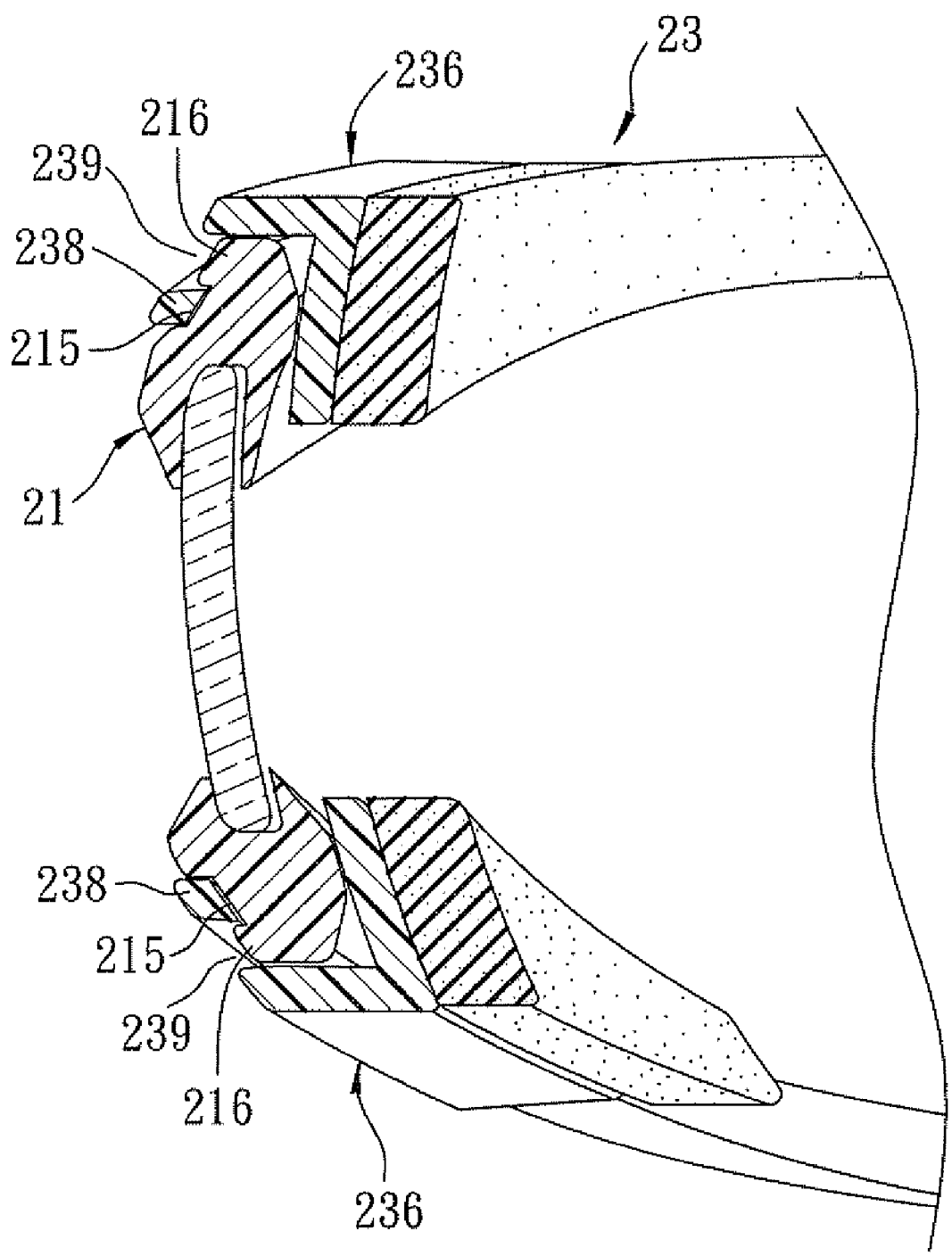
FIG. 4 is another fragmentary side sectional view of the preferred embodiment.

The frame 21 is formed with a recess 214 and a protrusion 216. Further, the auxiliary support 23 includes a bar 231 abutting against the frame 21, a clasp 233 extending downwardly from the bar 231 and engaging releasably the slot 213 in the bridge 212 (see FIG. 3), a hook 234 protruding from the bar 231 and engaging releasably the recess 214, and a buckle 236 protruding from the bar 231 and formed with an aperture 239. The protrusion 216 of the frame 21 engages releasably the aperture 239 in the buckle 236, as best shown in FIG. 4.

Further, the frame 21 has front and rear surfaces. The bar 231 of the auxiliary support 23 abuts against the rear surface of the frame 21. In the preferred embodiment, the rear surface of the frame 21 is formed with the recess 214, and the front surface of the frame 21 is formed with a notch 215. The protrusion 216 of the frame 21 is formed in the notch 215, and the buckle 236 engages releasably the notch 215 in the frame 21.

In the preferred embodiment, the bridge 212 has a top surface, and the slot 213 is formed in the top surface.

Further, in the preferred embodiment, the frame 21 is formed with a pair of the recesses 214 (only one is shown in FIG. 1), and each of the lens holders 211 has an outer end distal from the bridge 212. Each of the recesses 214 is formed in a respective one of the lens holders 211 adjacent to the outer end thereof.

Figure 5:
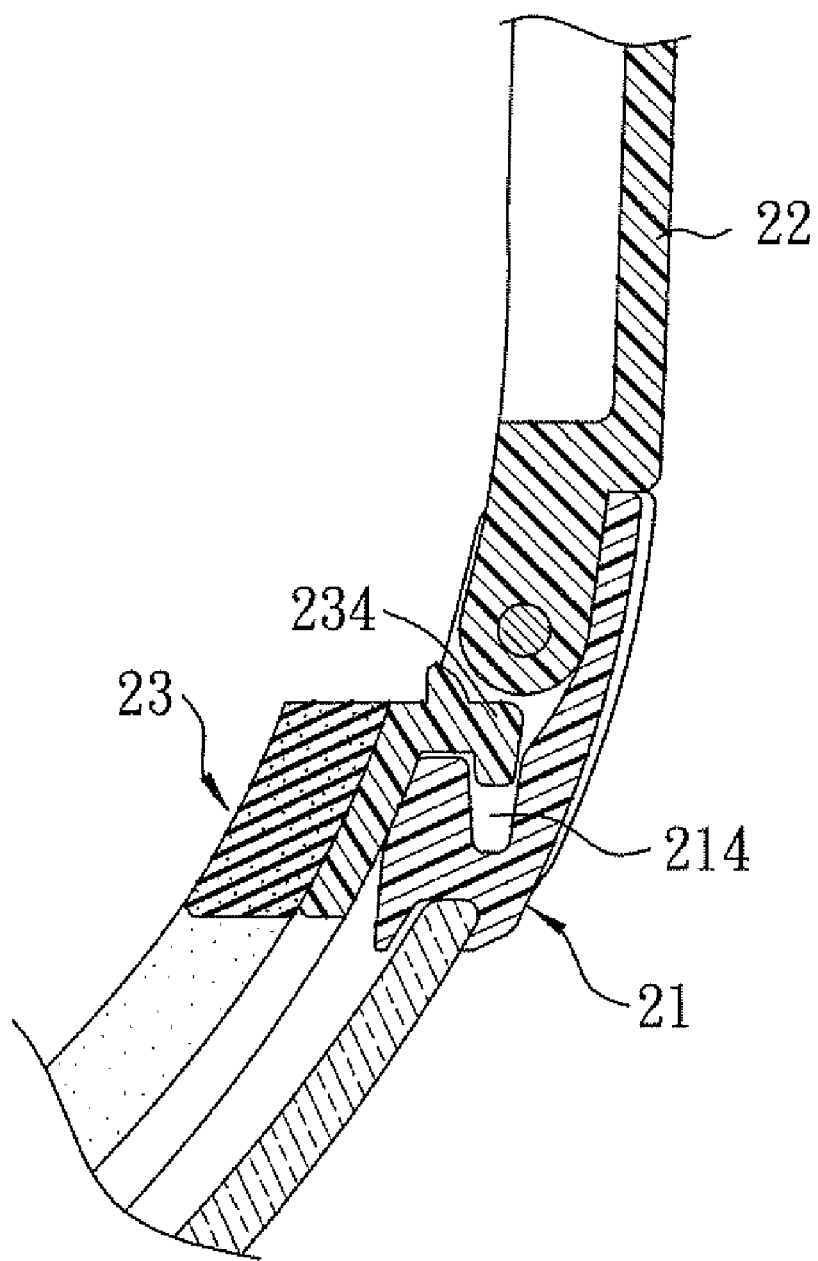
FIG. 5 is a fragmentary top sectional view of the preferred embodiment.
Figure 6:
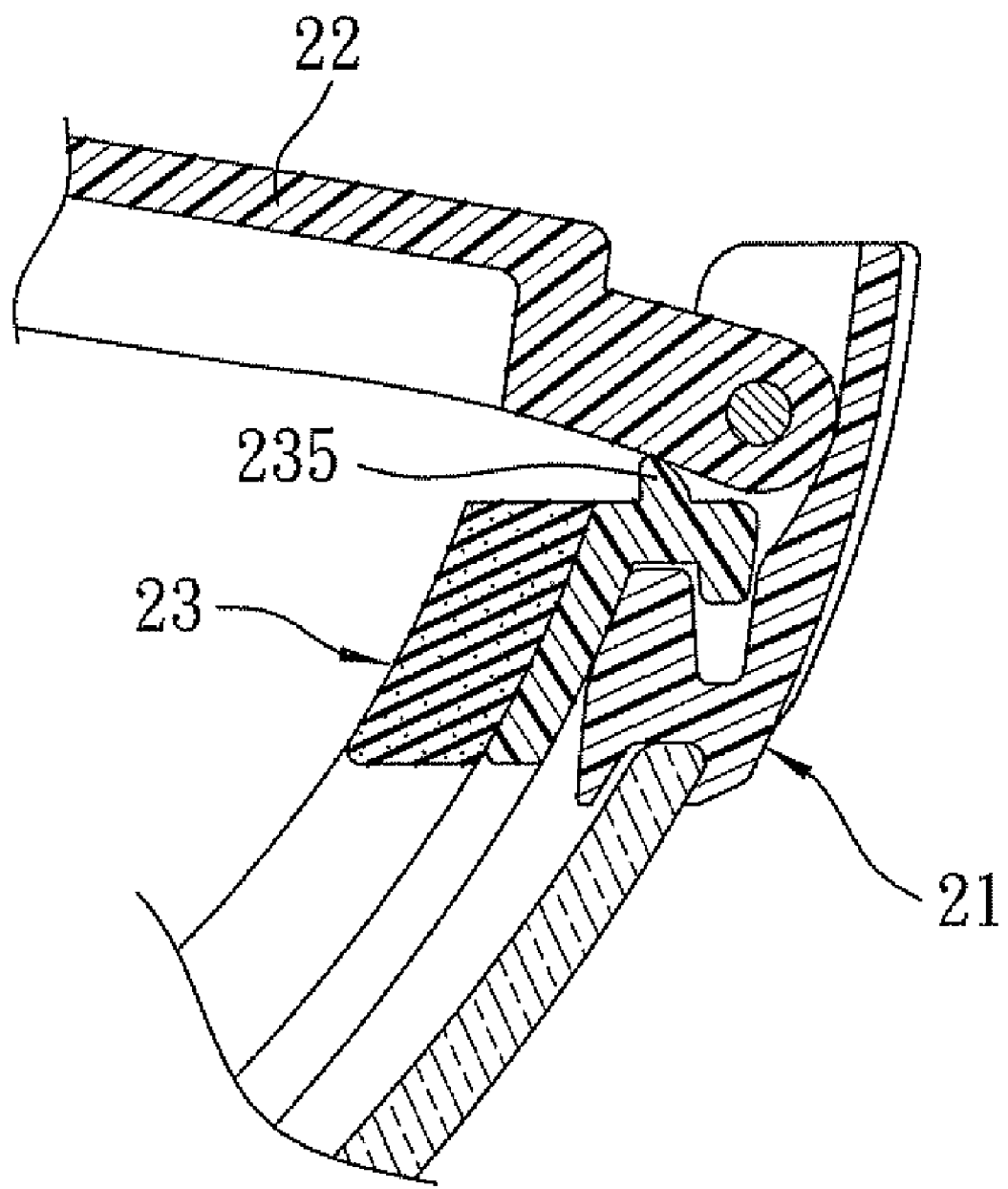
FIG. 6 is a view similar to FIG. 5, but illustrating a temple folded to abut against a respective abutment member.

In the preferred embodiment, the frame 21 is formed with four of the notches 215 (only two are shown in FIG. 1), and includes four of the protrusions 216 (only two are shown in FIG. 1) corresponding in location respectively to the notches 215. In the preferred embodiment, each pair of one of the notches 215 and one of the protrusions 216 is provided in a corner portion of a respective one of the lens holders 211 at the outer end thereof. The auxiliary support 23 includes a pair of the hooks 234 (only one is shown in FIG. 1) engaged releasably with the recesses 214, respectively, and four of the buckles 236 associated with a respective pair of one of the notches 215 and one of the protrusions 216. In the preferred embodiment, each of the buckles 236 includes a first member 237 extending frontwardly from the bar 231, and a second member 238 that extends substantially transverse to the first member 237, that engages releasably a respective one of the notches 215, and that is formed with a respective one of the apertures 239. Reference is now made to FIGS. 1,5, and 6. The eyeglasses 2 also include a pair of temples 22 each pivotally coupled to the outer end of a respective one of the lens holders 211. The auxiliary support 23 further includes a pair of abutment members 235 that extend rearwardly and respectively from the hooks 234. The temples 22 respectively rest on the abutment members 235 when folded by pivoting on the lens holders 211.

With reference again to FIGS. 1 and 2, in the preferred embodiment, the auxiliary support 23 further includes a soft pad 232 disposed on the bar 231 on a side of the bar 231 opposite to that abutting against the frame 21.

The bar 231 of the frame holder 23 is fabricated from a flexible material. The soft pad 232 has a shape similar to the bar 231 and is provided on the side of the bar 231 opposite to that abutting against the frame 21, as described above.

Considering the abovementioned structure of the eyeglasses 2, there are three locking mechanisms employed in order to securely assemble the auxiliary support 23 onto the frame 21. First, the four buckles 236 are fittingly and respectively engaged with the notches 215 and the protrusions 216. Second, the clasp 233 engages the slot 233. Finally, the hooks 234 engage respectively the recesses 214. In this state of engagement, the eyeglasses 2 can be effectively used as safety eyeglasses. In particular, the auxiliary support 23 covers the gap that is formed between the frame 21 and the vicinity of the wearer's eye region so as to prevent particles and other small objects from reaching the wearer's eyes. Additionally, the soft pad 232 provides comfort to the wearer. Therefore, the eyeglasses 2 provide comfort and safety to the wearer.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A pair of eyeglasses, comprising:
    a frame including a pair of lens holders and a bridge interconnecting said lens holders, said bridge being formed with a slot; and
    an auxiliary support detachably mounted on said frame;
    said frame being formed with a recess and a protrusion;
    said auxiliary support including a bar abutting against said frame, a clasp extending downwardly from said bar and engaging releasably said slot in said bridge, a hook protruding from said bar and engaging releasably said recess, and a buckle protruding from said bar and formed with an aperture, said protrusion of said frame engaging releasably said aperture in said buckle.

2. The eyeglasses as claimed in claim 1, wherein said frame has front and rear surfaces, said bar of said auxiliary support abutting against said rear surface of said frame, said rear surface of said frame being formed with said recess, said front surface of said frame being formed with a notch, said protrusion of said frame being formed in said notch, said buckle engaging releasably said notch in said frame.

3. The eyeglasses as claimed in claim 2, wherein said bridge has a top surface and said slot is formed in said top surface;
    said frame is formed with a pair of said recesses and each of said lens holders has an outer end distal from said bridge, each of said recesses being formed in a respective one of said lens holders adjacent to said outer end thereof;
    said frame is formed with four of said notches and includes four of said protrusions corresponding in location respectively to said notches, each pair of one of said notches and one of said protrusions being provided in a corner portion of a respective one of said lens holders at said outer end thereof;
    said auxiliary support includes a pair of said hooks engaging releasably said recesses, respectively; and
    said auxiliary support includes four of said buckles associated with a respective pair of one of said notches and one of said protrusions.

4. The eyeglasses as claimed in claim 3, wherein each of said buckles includes a first member extending frontwardly from said bar, and a second member that extends substantially transverse to said first member, that engages releasably a respective one of said notches, and that is formed with a respective one of said apertures.

5. The eyeglasses as claimed in claim 4, further comprising a pair of temples each pivotally coupled to said outer end of a respective one of said lens holders.

6. The eyeglasses as claimed in claim 5, wherein said auxiliary support further includes a pair of abutment members extending rearwardly and respectively from said hooks, said temples respectively resting on said abutment members when folded by pivoting on said lens holders.

7. The eyeglasses as claimed in claim 1, wherein said auxiliary support further includes a soft pad disposed on said bar on a side of said bar opposite to that abutting against said frame.

* * * * *